United States Patent
Saiki et al.

(10) Patent No.: US 6,259,935 B1
(45) Date of Patent: Jul. 10, 2001

(54) ELECTRO-MECHANICAL-ACOUSTIC TRANSDUCING DEVICE

(75) Inventors: Shuji Saiki, Uda-gun; Kazue Sato, Neyagawa; Sawako Usuki, Kobe; Mitsukazu Kuze, Osaka, all of (JP)

(73) Assignee: Matsushita Electrical Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/102,327

(22) Filed: Jun. 22, 1998

(30) Foreign Application Priority Data

Jun. 24, 1997 (JP) .................................................. 9-166963
Dec. 25, 1997 (JP) .................................................. 9-357058

(51) Int. Cl.⁷ .................................................. H04Q 7/32
(52) U.S. Cl. ........................ 455/567; 340/388.4; 379/373
(58) Field of Search ............................. 340/407.1, 384.7, 340/388.4, 392.5; 379/373; 455/550, 575, 90, 567; 381/96

(56) References Cited

U.S. PATENT DOCUMENTS

| 3,889,166 | 6/1975 | Scurlock . |
| 4,522,067 | 6/1985 | Burger et al. . |
| 4,629,829 | * 12/1986 | Puhl et al. ............................ 455/570 |
| 5,226,089 | 7/1993 | Yoon et al. . |
| 5,436,622 | 7/1995 | Gutman et al. . |
| 5,524,061 | 6/1996 | Mooney et al. ....................... 381/151 |
| 5,590,417 | * 12/1996 | Rydbeck ............................... 455/568 |
| 5,596,311 | * 1/1997 | Bess et al. ............................ 340/384.7 |
| 5,619,181 | * 4/1997 | Murray ................................. 340/407.1 |
| 5,642,413 | * 6/1997 | Little .................................... 379/373 |
| 5,649,020 | * 7/1997 | McClurg et al. ..................... 381/151 |
| 5,682,132 | * 10/1997 | Hiroyoshi et al. ................... 340/407.1 |
| 5,754,096 | * 5/1998 | Muto et al. .......................... 340/407.1 |
| 5,832,096 | * 11/1998 | Hall ....................................... 381/400 |
| 5,853,020 | * 12/1998 | Widner ................................. 137/227 |
| 5,936,516 | * 8/1999 | Nerea et al. ......................... 340/407.1 |

FOREIGN PATENT DOCUMENTS

| 0724243 | 7/1996 | (EP) . |
| 8275293 | 10/1996 | (JP) . |

OTHER PUBLICATIONS

European Search Report related to European Patent Application No. 98111507.4 dated Nov. 4, 1998.
A Von Weiss: "Ubersicht uber die allegemeine Elektrotechnik" 1954, C.F. Winter Sche Verlagschandlung, Fussen, Germany XP002080054, pp. 386 and 387, Aufgabe 14.

* cited by examiner

Primary Examiner—Edward F. Urban
(74) Attorney, Agent, or Firm—Renner, Otto, Boiselle & Sklar LLP

(57) ABSTRACT

An electro-mechanical-acoustic transducing device includes: an electro-mechanical-acoustic transducer which has at least one resonance frequency, for converting an input electric signal into only vibration, or into both vibration and sound; a signal supplying unit for supplying a signal in a frequency band which includes at least one of the resonance frequencies of the electro-mechanical-acoustic transducer as the input signal of the electro-mechanical-acoustic transducer; and a frequency detector for detecting a signal component having a frequency corresponding to the mechanical resonance frequency of the electro-mechanical-acoustic transducer in an electric signal which is output from the electro-mechanical-acoustic transducer, and outputting the signal component as a part of an input signal to the signal supplying unit.

23 Claims, 12 Drawing Sheets

ELECTRO-MECHANICAL-ACOUSTIC TRANSDUCING DEVICE

BACKGROUND OF THE INVENTION

1. Field of the Invention

The present invention relates to an electro-mechanical-acoustic transducing device which is used for generating a ring-back calling tone or vibration in portable terminal devices such as a portable telephone, a pager, a personal handy phone set, and the like.

2. Description of the Related Art

As means for informing a user that a call is coming, a conventional portable terminal device (e.g., a conventional portable telephone, pager, personal handy phone set, or the like) generally includes both a small beeper for generating a bell sound and a micromotor in which vibration is caused by a weight eccentrically attached to a rotation shaft. On the other hand, U.S. Pat. No. 5,524,061 discloses a portable telephone containing an electro-mechanical-acoustic transducing device which realizes the generation of sound or vibration for informing a user that a call is coming using one unit in order to reduce the size and weight of a portable terminal device.

According to the electro-mechanical-acoustic transducing device disclosed in above-mentioned U.S. Pat. No. 5,524,061, by supplying an electric signal to an electromagnetic coil of an electromagnetic driver which is attached to a soundboard, a magnetic motional mass unit is vibrated due to a magnetic force affecting a region between the electromagnetic coil and the magnetic motional mass unit. The vibration is transferred to the soundboard, thereby generating vibration and sound. Such vibration becomes intensified in the vicinity of a resonance frequency of a mechanical resonance system constituted by the magnetic motional mass unit and a non-linear spring that supports the magnetic motional mass unit. Thus, the electric signal to be supplied to the electromagnetic coil is set to have a predetermined range of frequency containing the aforementioned resonance frequency (more accurately, so as to repeatedly sweep the predetermined frequency range in a successive manner) by a sweep frequency generator. The vibration reaches its maximum when the mechanical resonance frequency of the magnetic motional mass unit and the non-linear spring coincides with the frequency of the electric signal supplied to the electromagnetic coil.

According to such a conventional system, however, the supplied electric signal is swept in the entire frequency range including frequencies which do not correspond to the mechanical resonance frequency. The vibration becomes small when the electric frequency does not correspond to the mechanical resonance frequency upon sweeping. Therefore, in the above conventional system, an efficiency in the output of mechanical vibration with respect to an electrical input is often low.

SUMMARY OF THE INVENTION

An electro-mechanical-acoustic transducing device of the present invention includes: an electro-mechanical-acoustic transducer which has at least one resonance frequency, for converting an input electric signal into only vibration, or into both vibration and sound; a signal supplying unit for supplying a signal in a frequency band which includes at least one of the resonance frequencies of the electro-mechanical-acoustic transducer as the input signal of the electro-mechanical-acoustic transducer; and a frequency detector for detecting a signal component having a frequency corresponding to the mechanical resonance frequency of the electro-mechanical-acoustic transducer in an electric signal which is output from the electro-mechanical-acoustic transducer, and outputting the signal component as a part of an input signal to the signal supplying unit.

In one embodiment, the signal supplying unit is an amplifier for amplifying a given input signal.

In one embodiment, the amplifier amplifies a noise which is generated in an electrical circuit system including at least one of the amplifier and the frequency detector as the input signal.

In another embodiment, a signal generator is further included in generating a signal in a frequency band including at least one of the resonance frequencies of the electro-mechanical-acoustic transducer and supplying the signal as the input signal of the amplifier.

In such a case, the amplifier may amplify a noise which is generated in an electrical circuit system including at least one of the amplifier and the frequency detector as a part of the input signal.

In one embodiment, the electro-mechanical-acoustic transducer is structured so as to have at least two mechanical resonance frequencies and to respectively convert input electric signals corresponding to at least two of the resonance frequencies into vibration or sound. The signal supplying unit includes a first oscillator for oscillating a first electric signal in a frequency band including at least one of the resonance frequencies of the electro-mechanical-acoustic transducer and outputting the first electric signal as the input signal of the electro-mechanical-acoustic transducer, and a second oscillator for oscillating a second electric signal at a frequency corresponding to the at least one resonance frequency of the electro-mechanical-acoustic transducer and outputting the second electric signal as the input signal of the electro-mechanical-acoustic transducer. And a controller is further provided for controlling the second oscillator so as to oscillate a signal having the frequency corresponding to the mechanical resonance frequency of the electro-mechanical-acoustic transducer at a predetermined timing based on detection information of the frequency detector.

Furthermore, a voltage comparator may be further included for comparing an output voltage of the frequency detector with a predetermined reference potential, and supplying information regarding a potential difference to the controller.

In one embodiment, the signal supplying unit includes an oscillator for oscillating an electric signal in a frequency band including at least one of the resonance frequencies of the electro-mechanical-acoustic transducer, and outputting the electric signal as the input signal of the electro-mechanical-acoustic transducer. A controller is further provided for controlling the oscillator so as to oscillate a signal having a frequency corresponding to the mechanical resonance frequency of the electro-mechanical-acoustic transducer at a predetermined timing based on detection information of the frequency detector.

Furthermore, a voltage comparator may be further included for comparing an output voltage of the frequency detector with a predetermined reference potential and supplying information regarding a potential difference to the controller.

The controller may control the oscillator so that the oscillator performs oscillation of the electric signal in the frequency band including at least one of the resonance frequencies of the electro-mechanical-acoustic transducer and oscillation of the signal having the frequency corresponding to the mechanical resonance frequency of the electro-mechanical-acoustic transducer which is detected by the frequency detector in a time-divisional manner.

Alternatively, the controller may control the oscillator so that the oscillator oscillates the electric signal so as to sweep the frequency band including at least one of the resonance frequencies of the electro-mechanical-acoustic transducer, and upon detection by the frequency detector of the mechanical resonance frequency of the electro-mechanical-acoustic transducer, oscillates the signal having the frequency corresponding to the detected mechanical resonance frequency.

The frequency detector may include a bridge circuit constituted by using an electrical impedance of a predetermined component of the electro-mechanical-acoustic transducer as one of component circuit elements.

The predetermined component of the electro-mechanical-acoustic transducer may be a voice coil.

Each of the other three component circuit elements in the bridge circuit may be a circuit element containing a resistance component.

In one embodiment, in the case where an electrical impedance of the predetermined component of the electro-mechanical-acoustic transducer is named Z1; an electrical impedance of the component circuit element of the bridge circuit, which is serially connected to the electrical impedance Z1, is named Z2; and electrical impedances of the component circuit elements of the bridge circuit, constituting a serial connection circuit which is connected in parallel to a serial connection circuit of the electrical impedances Z1 and Z2 are named Z3 and Z4, the bridge circuit is structured so that an input voltage is supplied between a node of the electrical impedance Z1 and the electrical impedance Z3 and a node of the electrical impedance Z2 and the electrical impedance Z4, and an output voltage is taken out from between a node of the electrical impedance Z1 and the electrical impedance Z2 and a node of the electrical impedance Z3 and the electrical impedance Z4.

The electrical impedance Z2 may be a temperature-sensitive resistor in which a resistance value thereof is changed along with a change of an ambient temperature.

The resistance-temperature characteristics of the temperature-sensitive resistor may be substantially the same as that of the electrical impedance Z1 which is the predetermined component of the electro-mechanical-acoustic transducer.

In one embodiment, a filter is further included for allowing a signal having a frequency corresponding to at least one of the resonance frequencies of the electro-mechanical-acoustic transducer to pass therethrough.

In one embodiment, a limiter is further included for limiting a voltage level of the output signal of the frequency detector, which is connected to an output side of the frequency detector.

A portable terminal device of the present invention includes: an antenna for receiving a call-incoming signal; a received signal processing unit for performing a signal-processing operation for the call-incoming signal and outputting a predetermined electric signal; and an electro-mechanical-acoustic transducing device having the features as set forth above, and a signal input condition to the electro-mechanical-acoustic transducing device is controlled by the electric signal from the received signal processing unit.

The signal which is output from the received signal processing unit may be supplied as a part of the input signal of the signal supplying unit included in the electro-mechanical-acoustic transducing device.

Alternatively, the signal which is output from the received signal processing unit may be supplied as a part of the input signal of the electro-mechanical-acoustic transducer included in the electro-mechanical-acoustic transducing device.

The electro-mechanical-acoustic transducer included in the electro-mechanical-acoustic transducing device may be configured to further exhibit a function as a receiver for reproducing audio signal to a user.

According to the electro-mechanical-acoustic transducing device of this invention by constantly detecting a change in the mechanical resonance frequency of the electro-mechanical-acoustic transducer by the frequency detector, it is possible to efficiently obtain an extremely stable oscillation output. In addition, by detecting the mechanical resonance frequency with the frequency detector and controlling the predetermined oscillator operation based on the detected information, it is possible to find the mechanical resonance frequency very easily and to allow the operation in the mechanical resonance frequency to be performed very quickly and easily.

Moreover, the present invention realizes the structure capable of maintaining a stable resonance state by constantly monitoring and correcting a change in the resonance frequency due to an environmental change. For example, the above-described frequency detector may have a structure for detecting a signal having a frequency corresponding to the mechanical resonance frequency of the electro-mechanical-acoustic transducer using the bridge circuit including the electrical impedance of the electro-mechanical-acoustic transducer as one element. Furthermore, upon structuring the bridge circuit, by employing a circuit element having resistance-temperature characteristics substantially equal to those of the electro-mechanical-acoustic transducer, it is possible to compensate for the change in the resistance component due to the temperature change. Thus, it is possible to maintain a stable mechanical resonance state.

Thus, the invention described herein makes possible the advantages of (1) providing an electro-mechanical-acoustic transducing device capable of efficiently obtaining an extremely stable vibration output by continuously detecting a resonance frequency of a mechanical resonance system and feedbacking an electric signal having a frequency corresponding to the mechanical resonance frequency, and (2) providing a portable terminal device having the above-described electro-mechanical-acoustic transducing device, for example, for the purpose of generating sound or vibration which informs a user that a call is coming.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative, but non-limiting examples with reference to the accompanying drawings.

EXAMPLE 1

Figure 1:
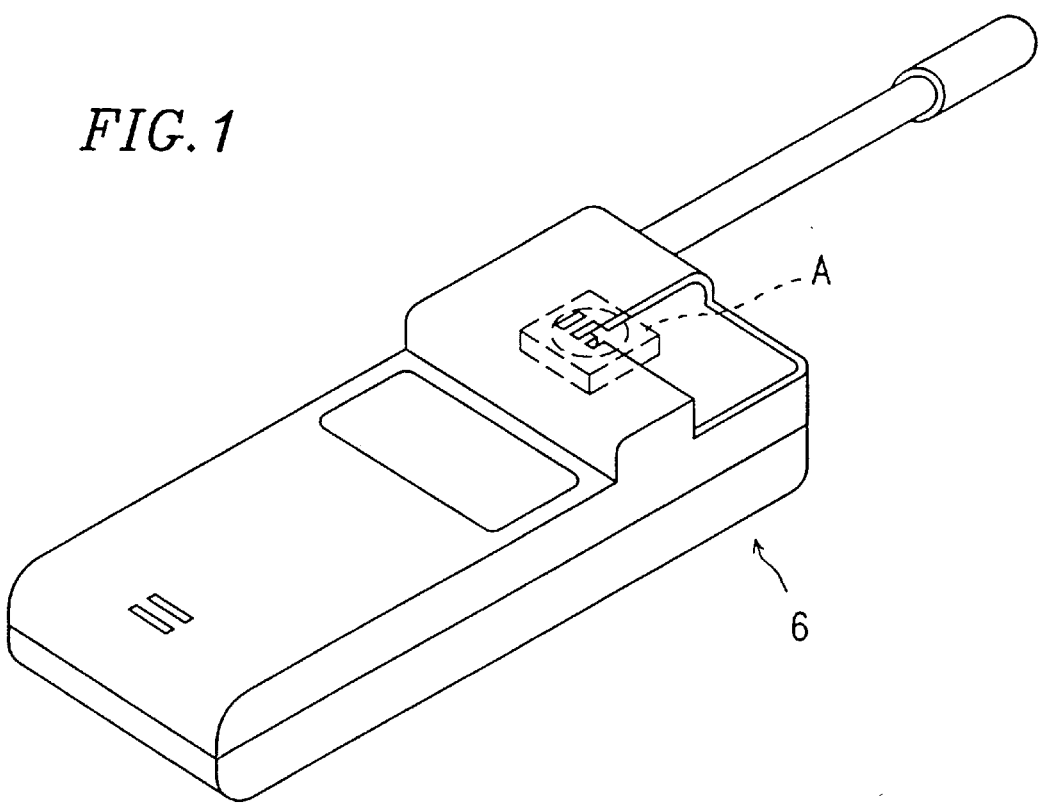
FIG. 1 is a perspective view schematically showing a portable telephone as one example of a portable terminal device into which an electro-mechanical-acoustic transducing device according to the present invention may be incorporated.
Figure 2:
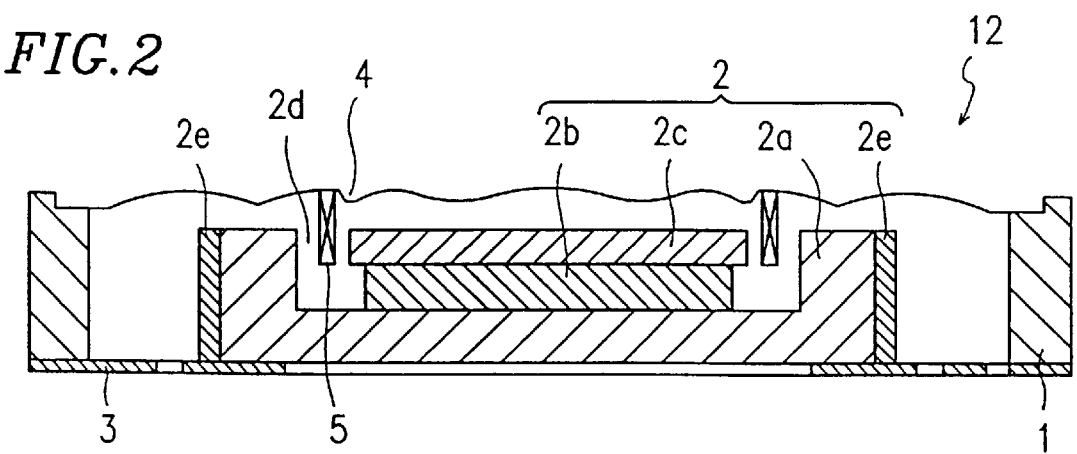
FIG. 2 is a cross-sectional view showing the structure of an electro-mechanical-acoustic transducer (means) which is a main portion of the electro-mechanical-acoustic transducing device according to the present invention.
Figure 3:
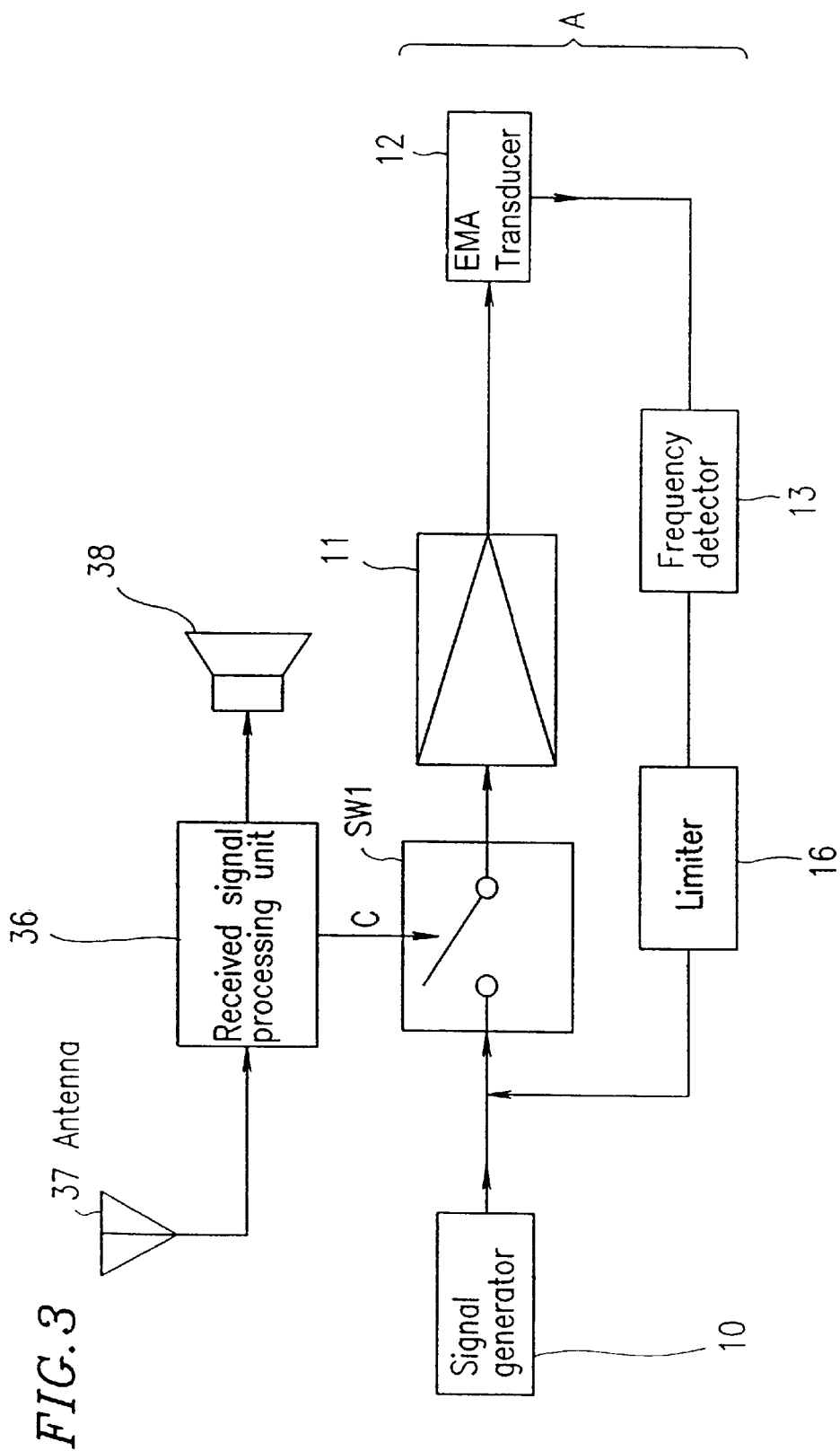
FIG. 3 is a block circuit diagram illustrating the main portion of the portable terminal device (i.e., the portable telephone) into which the electro-mechanical-acoustic transducing device according to the present invention is incorporated.
Figure 4:
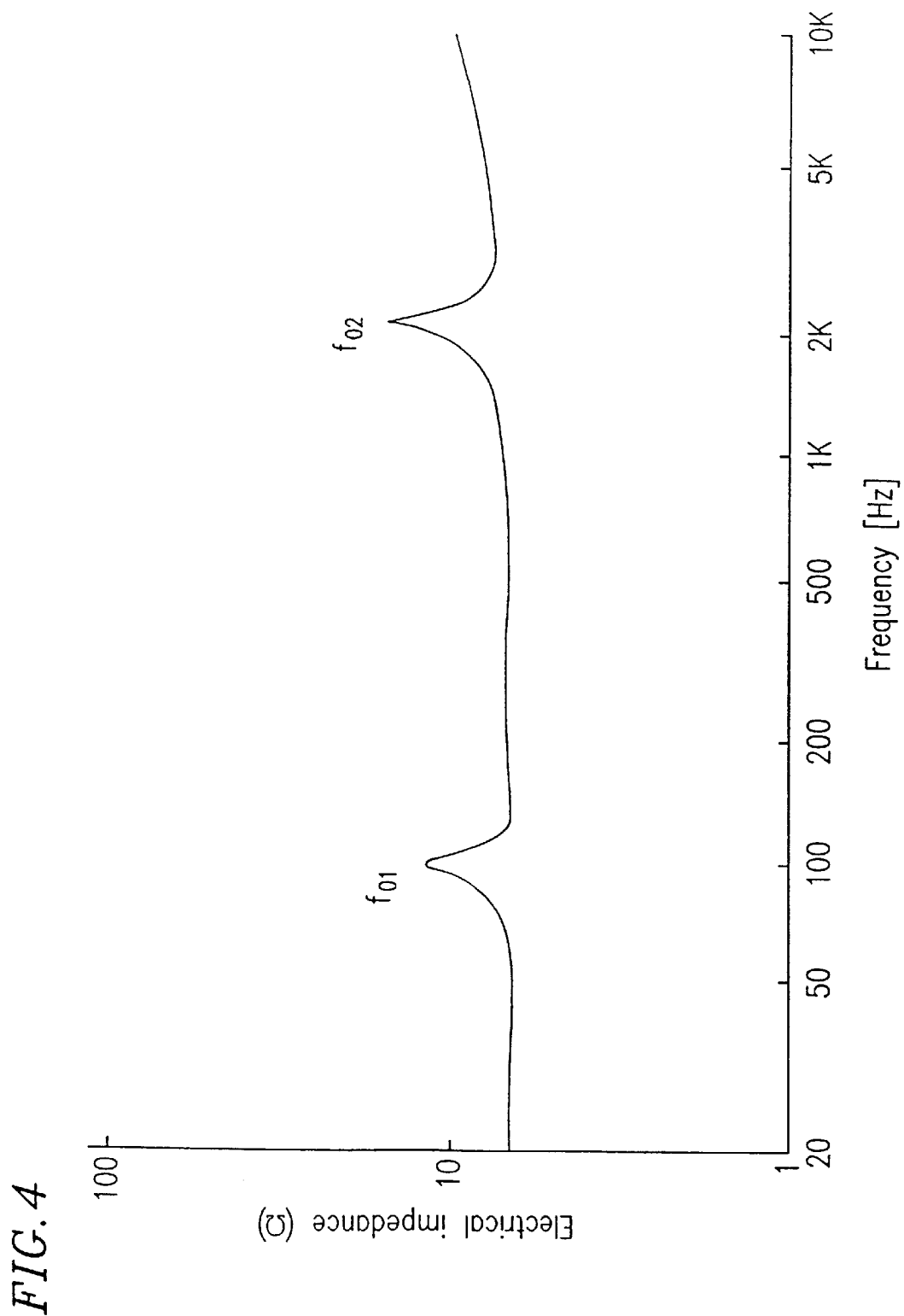
FIG. 4 is a graph showing frequency characteristics of electrical impedance of the electro-mechanical-acoustic transducer in the electro-mechanical-acoustic transducing device according to the present invention.

FIG. 1 is a perspective view schematically showing a portable telephone 6 as an example for a portable terminal device into which an electro-mechanical-acoustic transducing device A according to the present invention may be incorporated. FIG. 2 is a cross-sectional view showing the structure of an electro-mechanical-acoustic transducer (means) 12 which is a main portion of the electro-mechanical-acoustic transducing device A according to the present invention. FIG. 3 is a block circuit diagram illustrating the main portion the portable terminal device (i.e., the portable telephone 6) into which the electro-mechanical-acoustic transducing device A according to the present invention is incorporated. FIG. 4 is a graph showing frequency characteristics of electrical impedance of the electro-mechanical-acoustic transducer 12 in the electro-mechanical-acoustic transducing device A.

According to the electro-mechanical-acoustic transducing device A which is incorporated into the portable telephone 6 as shown in FIG. 1, in the main portion thereof, i.e., in the electro-mechanical-acoustic transducer 12, a supporting member 1 has two openings at both sides thereof, and a movable unit 2 is attached via a suspension 3 to one of the openings of the supporting member 1 as shown in FIG. 2. The movable unit 2 includes a yoke 2a, a magnet 2b, a plate 2c and a weight 2e. A voice coil 5 coupled to a diaphragm 4 is inserted into magnetic gaps formed between the yoke 2a and the plate 2c of the movable unit 2. The diaphragm 4 is mounted on the other opening of the supporting member 1. The weight 2e may be made of the same material as that of the yoke 2a. Alternatively, the weight 2e and the yoke 2a may be made of different materials from each other.

The operation of the electro-mechanical-acoustic transducer 12 will be described hereinafter.

The movable unit 2 including the suspension 3 constitutes a mechanical resonance system by its mass and stiffness of the suspension 3, and has its natural resonance frequency f01 (see FIG. 4). In addition, the diaphragm 4 coupled to the voice coil 5 constitutes another mechanical resonance system by its stiffness and mass, and has its natural resonance frequency f02 (see FIG. 4).

When an electric signal is supplied to the voice coil 5 in the electro-mechanical-acoustic transducer 12 having the aforementioned two mechanical resonance systems, action and reaction force is generated between the voice coil 5 and the movable unit 2. When the frequency of the electric signal supplied to the voice coil 5 is identical with the natural resonance frequency f01 of the movable unit 2, the movable unit 2 vibrates greatly. The vibration force is transferred to the supporting member 1 via the suspension 3, thereby vibrating the supporting member 1. On the other hand, when the frequency of the electric signal supplied to the voice coil 5 is identical with the natural resonance frequency f02 of the diaphragm 4 coupled to the voice coil 5, the diaphragm 4 vibrates greatly, thereby generating a buzzer sound. Alternatively, when an electric signal having a frequency bandwidth containing the natural resonance frequency f02 of the diaphragm 4 is input to the voice coil 5, music or speech is reproduced as in a typical loudspeaker.

Next, with reference to the block diagram of FIG. 3, the operation of the electro-mechanical-acoustic transducing device A including the electro-mechanical-acoustic transducer 12 shown in FIG. 2 will be described.

With reference to the block diagram of FIG. 3, an antenna 37 receives a transmitted signal (i.e., a call-incoming signal). The call-incoming signal contains a reception signal for informing a user that a call is coming and a receiving sound signal (i.e., a voice of a sender). The received call-incoming signal is processed at a received signal processing unit 36. First, in response to the reception signal for informing a recipient of the call, a signal C is generated. When the recipient is informed that the call is coming and thus switches the portable terminal device (the portable telephone) to be ready to receive the call, the received signal processing unit 36 stops the signal C and becomes ready to send the receiving sound signal to a receiver 38. The receiver 38, which is a small-sized loudspeaker, generates receiving sound based on the receiving sound signal.

The aforementioned generated signal C turns ON a normally-off switch SW1. When the switch SW1 is turned ON, an output signal from a signal generator 10 is sent to an amplifier 11 and amplified, and then input to the electro-mechanical-acoustic transducer 12. The electro-mechanical-acoustic transducer 12 has, for example, the aforementioned structure described with reference to FIG. 2. However, the structure of the aforementioned electro-mechanical-acoustic transducer 12 is described only for clearly illustrating the present invention, and the present invention is not limited to this structure. The electro-mechanical-acoustic transducer 12 which is included in the electro-mechanical-acoustic transducing device A according to the present invention may have any other structure as long as the structure can reproduce vibration and sound.

The signal generator 10 generates a signal with a relatively wide frequency band including at least one of the natural frequencies (f01 or f02 in FIG. 4) of the electro-mechanical-acoustic transducer 12, e.g., a signal such as white noise. However, the voltage level of the output signal thereof is substantially constant over the entire predetermined frequency band, and controlled (or suppressed) to a level so as not to drive the electro-mechanical-acoustic transducer 12 to substantially generate sound or vibration even after the amplification by the amplifier 11.

While the output signal from the signal generator 10 is supplied to the electro-mechanical-acoustic transducer 12 after the amplification by the amplifier 11 as described above, electrical impedance rapidly increases, due to a mechanical resonance phenomenon, with respect to an electric signal having a frequency corresponding to the mechanical natural frequency (f01 or f02 in FIG. 4) of the electro-mechanical-acoustic transducer 12. In accordance with the change (i.e., the increase) in the electrical impedance, a frequency detector 13 detects an electric signal having the frequency corresponding to the aforementioned mechanical natural frequency (f01 or f02 in FIG. 4). Then, by feedbacking the detected signal to the input side of the amplifier 11, the electric signal having the frequency corresponding to the natural frequency (f01 or f02 in FIG. 4) of the electro-mechanical-acoustic transducer 12 is further amplified.

By repeating such a selective amplification of the electric signal having he frequency corresponding to the mechanical resonance frequency, either vibration or sound (or both) is generated by the electro-mechanical-acoustic transducer 12 in a self-oscillating manner upon the arrival of the signal.

In the block diagram of FIG. 3, the output of the frequency detector 13 is feedbacked via a limiter 16. The limiter 16 is intended to limit a voltage level of a signal to be feedbacked from the frequency detector 13 to the amplifier 11 so as to keep the voltage level of an input signal to the electro-mechanical-acoustic transducer 12 constant. However, it is possible to omit the installation of the limiter 16.

According to the above-described structure, when the mechanical natural frequency of the electro-mechanical-acoustic transducer 12 is varied depending on a change in the environment where the electro-mechanical-acoustic transducer 12 is placed (e.g., depending on whether the portable telephone is held by a user, or whether the portable telephone is placed on a table), the level of the electric signal for driving the electro-mechanical-acoustic transducer 12, i.e., the level of the electric signal in a frequency corresponding to the original natural frequency is reduced. Such a reduction acts to suppress the generation of vibration or sound at the time of the arrival of a signal. However, the output of a signal form the signal generator 10, the amplification of the output signal by the amplifier 11, and further the supply of the amplified signal to the electro-mechanical-acoustic transducer 12 are performed in a successive manner. Thus, a resonance point established after the change as described above is newly detected by the frequency detector 13. Accordingly, vibration and sound are generated by the electro-mechanical-acoustic transducer 12 in a self-oscillating manner as in above, with respect to the electric signal having a frequency corresponding to the new resonance point established after the change.

As described above, according to the thus structured electro-mechanical-acoustic transducer 12 (and the electro-mechanical-acoustic transducing device A including the transducer 12) of this invention, generation of a signal or sound for informing a user that a call is coming is always performed in a stable manner upon the arrival of the signal.

Figure 5:
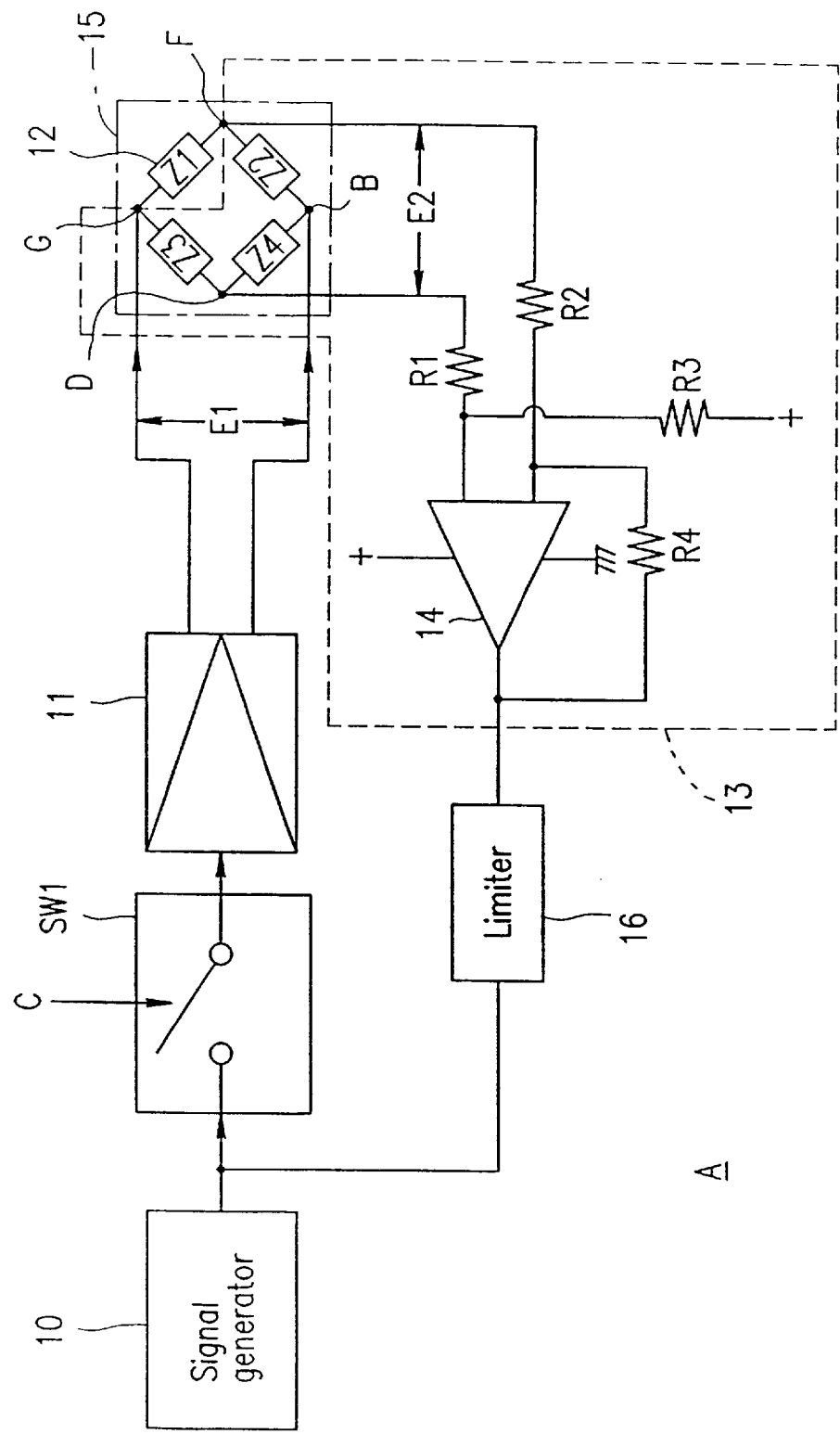
FIG. 5 shows a portion corresponding to the electro-mechanical-acoustic transducing device in the block diagram of FIG. 3, and particularly illustrates the structure of a frequency detector in detail.

FIG. 5 shows a portion corresponding to the electro-mechanical-acoustic transducing device A in the block diagram shown as FIG. 3. FIG. 5 particularly illustrates the structure of the frequency detector 13 in detail. In FIG. 5, the same components as those in FIG. 3 are denoted by the same reference numerals, and the description thereof is herein omitted. The antenna 37, the received signal processing unit 36, and the receiver 38 shown in FIG. 3 are omitted in FIG. 5.

The frequency detector 13 includes a bridge circuit 15, an operational amplifier 14, and resistors R1, R2, R3, and R4 accompanying therewith. In FIG. 5, Z2, Z3, and Z4 denote load impedances of circuit elements constituting the bridge circuit 15, respectively, and Z1 denotes an electrical impedance of the voice coil 5 (see FIG. 2) included in the electro-mechanical-acoustic transducer 12. The value of each of the impedances Z1, Z2, Z3, and Z4 constituting the bridge circuit 15 is set to obtain equilibrium thereof in such a manner that for a signal having a frequency which is different from the frequency corresponding to the mechanical resonance frequency of the electro-mechanical-acoustic transducer 12, an output voltage E2 becomes very small (preferable zero) with respect to an input voltage E1, while for a signal having a frequency corresponding to the mechanical resonance frequency of the electro-mechanical-acoustic transducer 12, the output voltage E2 becomes sufficiently large with respect to the input voltage E1.

Hereinafter, the operation of the frequency detector 13 will be described.

When the call-incoming signal is received, the aforementioned signal C is generated at the received signal processing unit 36 (see FIG. 3), thereby turning ON the normally-off switch SW1. When the switch SW1 is turned ON, an output signal from the signal generator 10 is sent to the amplifier 11. The output signal is amplified, and then input to the electro-mechanical-acoustic transducer 12.

While the output signal from the signal generator 10 which was amplified by the amplifier 11 is supplied to the electro-mechanical-acoustic transducer 12, if the electric signal having the frequency corresponding to the mechanical natural frequency (f01 or f02 in FIG. 4) of the electro-mechanical-acoustic transducer 12 is input to the electro-mechanical-acoustic transducer 12, the electrical impedance Z1 is rapidly increased. Consequently, equilibrium of the bridge circuit 15 is destroyed, thereby increasing the frequency component corresponding to the above-described natural frequency in the output voltage E2 from the bridge circuit 15. The output voltage E2 is amplified in the operational amplifier 14, and feedbacked to the input side of the amplifier 11 via the limiter 16 (however, as described above, the limiter 16 can be omitted). As a result, the electric signal having the frequency corresponding to the natural frequency (f01 or f02 in FIG. 4) of the electro-mechanical-acoustic transducer 12 is further amplified.

In the above-described manner, by repeating the selective amplification of the electric signal having a frequency corresponding to the resonance frequency, generation of either vibration or sound (or generation of both) is performed by the electro-mechanical-acoustic transducer 12 in a self-oscillating manner at the time of the arrival of the signal.

The bridge circuit 15 constituting the frequency detector 13 for detecting resonance frequency of the electro-mechanical-acoustic transducer 12 will be described in more detail hereinafter.

In the bridge circuit 15 constituted by the impedances Z1, Z2, Z3, and Z4, the input voltage E1 is applied between a node G of the impedance Z1 and the impedance Z3 and a node B of the impedance Z2 and the impedance Z4. Its corresponding output voltage E2 from the bridge circuit 15 is taken out from between a node F of the impedance Z1 and the impedance Z2 and a node D of the impedance Z3 and the impedance Z4. The relationship between the input voltage E1 and the output voltage E2 at this time is represented by the following expression:

$$E2=\{[Z1/(Z1+Z2)]-[Z3/(Z3+Z4)]\} \times E1$$

Herein, if Z1/Z2 equals Z3/Z4, the bridge 15 is in an equilibrium state, and thus the level of the output voltage E2 becomes zero.

In the case where the impedances Z2, Z3, and Z4 are, for example, fixed resistors; the values of the impedances Z2, Z3, and Z4 do not have frequency characteristics, and have constant resistance values over the entire frequency band. On the other hand, as shown in FIG. 4, the electrical impedance Z1 of the electro-mechanical-acoustic transducer 12 increases at the mechanical resonance frequencies f01 and f02 of the electro-mechanical-acoustic transducer 12. Therefore, for example, if the electrical impedance Z1 is set to a value close to a DC resistance value of the voice coil 5 shown in FIG. 2 to maintain equilibrium of the bridge circuit 15, the value of the electrical impedance Z1 increases when an input voltage E0 has the frequency corresponding to the mechanical resonance frequency of the electro-mechanical-acoustic transducer 12. Such an increase in the electrical impedance Z1 prevent equilibrium of the bridge circuit 15 from being satisfied. As a result, a signal at a high level is output as the output voltage E2. In the above-described manner, the bridge circuit 15 detects a mechanical resonance frequency of the electro-mechanical-acoustic transducer 12, and selectively detects and amplifies the electric signal having a frequency corresponding to the mechanical resonance frequency.

For example, in the case where the DC resistance value of the voice coil 5 of the electro-mechanical-acoustic transducer 12 is 8 Ω (i.e., the electrical impedance Z1=8 Ω), by making Z2=0.5 Ω, Z3=8000 Ω, and Z4=500 Ω, equilibrium of the bridge circuit 15, i.e., Z1/Z2=Z3/Z4, is satisfied.

In the circuit element constituting the impedance Z2 which is serially connected to the electro-mechanical-acoustic transducer 12 (specifically, to the electrical impedance Z1 corresponding to the voice coil 5 of the electro-mechanical-acoustic transducer 12), it is preferable to make the value of the impedance Z2 smaller than that of the electrical impedance Z1 in order to reduce power loss by this circuit element. Specifically, it is preferable to set ratio of the impedances (i.e., Z1/Z2=Z3/Z4) to be 10 or greater.

As the relationship between the serial connection of the impedances Z1 and Z2 and the serial connection of the impedances Z3 and Z4 which are connected to the impedances Z1 and Z2 in parallel, as shown in the aforementioned numerical example, it is preferable to set the value of the impedance Z3 to be the value 1000 times greater than the value of Z1 which is 8 Ω, i.e., 8000 Ω, (Z3>>Z1). Consequently, the most part of input current to the bridge circuit 15 is allowed to flow into the electro-mechanical-acoustic transducer 12 (i.e., the electrical impedance Z1). Thus, it is possible to prevent large power loss due to the circuit operation for the frequency detection (this circuit operation is not directly related to the main purpose of the electro-mechanical-acoustic transducer 12, i.e., the generation of vibration and sound upon receiving a call).

As described above, the electrical impedance Z1 of the electro-mechanical-acoustic transducer 12 may be the electrical impedance of the voice coil 5. The material of the voice coil 5 used for this type of electro-mechanical-acoustic transducer 12 is generally copper or aluminum. However, when the operation temperature for the device is changed to a lower temperature value or a higher temperature value than expected, the resistively of the voice coil 5 which is made of a copper or aluminum material (i.e., the value of the impedance Z1 of the bridge circuit 15) changes in accordance with the temperature change. The values of the impedances Z1, Z2, Z3, and Z4 of the bridge circuit 15 are preset so as to achieve equilibrium under the predetermined operation temperature. However, if the operation temperature for the bridge circuit 15 changes from the preset temperature, equilibrium of the bridge circuit 15 is no longer satisfied due to the change in the value of the impedance Z1 as described above. As a result, the operation of the frequency detector 13 may become unstable. In order to prevent such a situation, it is preferable to prevent the ratio of the load impedances (i.e., Z1/Z2=Z3/Z4) from changing with such a temperature change.

For example, by constituting the impedances Z3 and Z4 as fixed resistors and also selecting elements exhibiting a smaller temperature-induced change, the ratio Z3/Z4 is not greatly varied even when the operation temperature of the element is changed. Alternatively, if the impedances Z3 and Z4 are structured as resistors made of the same material, the rates of resistively changes along with the temperature change are the same. Therefore, it is possible to maintain the ratio of Z3/Z4 substantially constant with respect to the temperature change.

Similarly, if the impedance Z2 is structured by a circuit element having temperature characteristics equivalent to that of the voice coil 5 of the electro-mechanical-acoustic transducer 12, it becomes possible to keep the ratio of the impedance Z2 and the impedance Z1 corresponding to the voice coil 5 constant regardless of its temperature. Examples of the circuit element which may be used as the impedance Z2 for the aforementioned purpose include a temperature-sensitive resistor having the same temperature characteristics as that of the voice coil 5 (which is generally formed of copper, aluminum, or the like as described above) of the electro-mechanical-acoustic transducer 12, a high-frequency coil in which an inductance component thereof is negligible in the audio signal frequency band of about 20 kHz or less, and the like.

According to the above-described structure, even when the operation temperature of the device changes, the mechanical resonance frequency of the electro-mechanical-acoustic transducer 12 is detected by the frequency detector 13 in a stable and accurate manner. Thus, it becomes possible to realize the stable generation of vibration or sound upon the arrival of the signal in the electro-mechanical-acoustic transducer 12 at any time.

EXAMPLE 2

Figure 6:
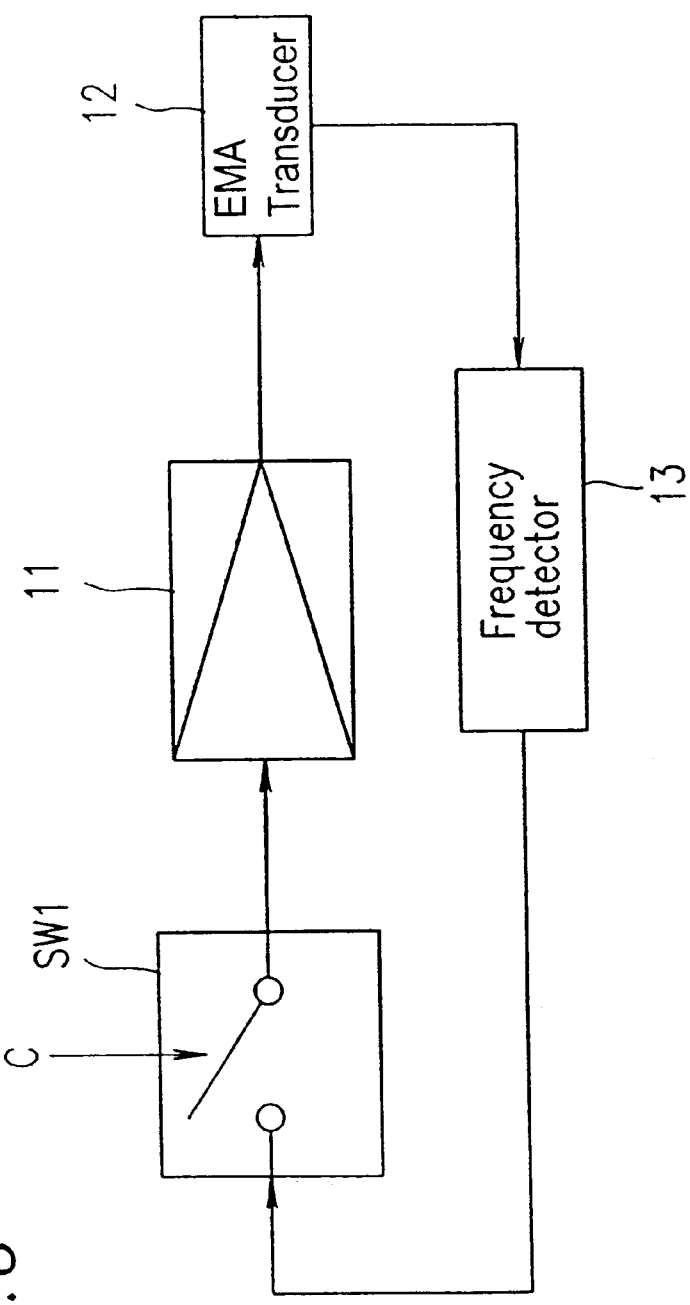
FIG. 6 is a block diagram showing the structure of an electro-mechanical-acoustic transducing device according to Example 2 of the present invention.

With reference to FIG. 6, the structure of an electro-mechanical-acoustic transducing device A2 according to Example 2 of the present invention will be described hereinafter. FIG. 6 is a block diagram showing the electro-mechanical-acoustic transducing device A2 of Example 2.

The same components as those described above are denoted by the same reference numerals, and the description thereof will be herein omitted.

In the electro-mechanical-acoustic transducing device A2 according to Example 2 of the present invention, the signal generator 10 which is included in the electro-mechanical-acoustic transducing device A of Example 1 is omitted. Specifically, instead of using the output signal (i.e., white noise) from the signal generator 10 as in the electro-mechanical-acoustic transducing device A of Example 1, the electro-mechanical-acoustic transducing device A2 of Example 2 positively uses noise such as thermal noise which is present in the electric circuit including the amplifier 11 and the frequency detector 13.

The structure or characteristics of the frequency detector 13 are the same as those described in Example 1 with reference to FIG. 5, and the like. Moreover, the same limiter as that in Example 1 may be provided. The description thereof will be herein omitted.

Noise such as thermal noise is constituted by frequency components in a wide frequency range, and the level thereof is generally low as compared to that of a signal component. When a switch SW1 is turned ON by a signal C which involves the arrival of a signal, such noise is amplified by an amplifier 11, and then input to the electro-mechanical-acoustic transducer 12. Herein, a mechanical resonance frequency of the electro-mechanical-acoustic transducer 12 is detected by the frequency detector 13. As described above in connection with Example 1, an electric signal having a frequency corresponding to the aforementioned mechanical resonance frequency is amplified in a selective and self-oscillating manner. As a result, vibration or sound is generated in the electro-mechanical-acoustic transducer 12.

As described above, according to Example 2 of the present invention, the signal generator 10 is omitted, thereby realizing the simplification and miniaturization of the electro-mechanical-acoustic transducing device A. In addition, as described in Example 1, by structuring the frequency detector 13 using a bridge circuit which includes temperature-sensitive resistors as component circuit elements, it becomes possible to obtain a stable output even when the temperature at which the device is used is changed.

EXAMPLE 3

Figure 7:
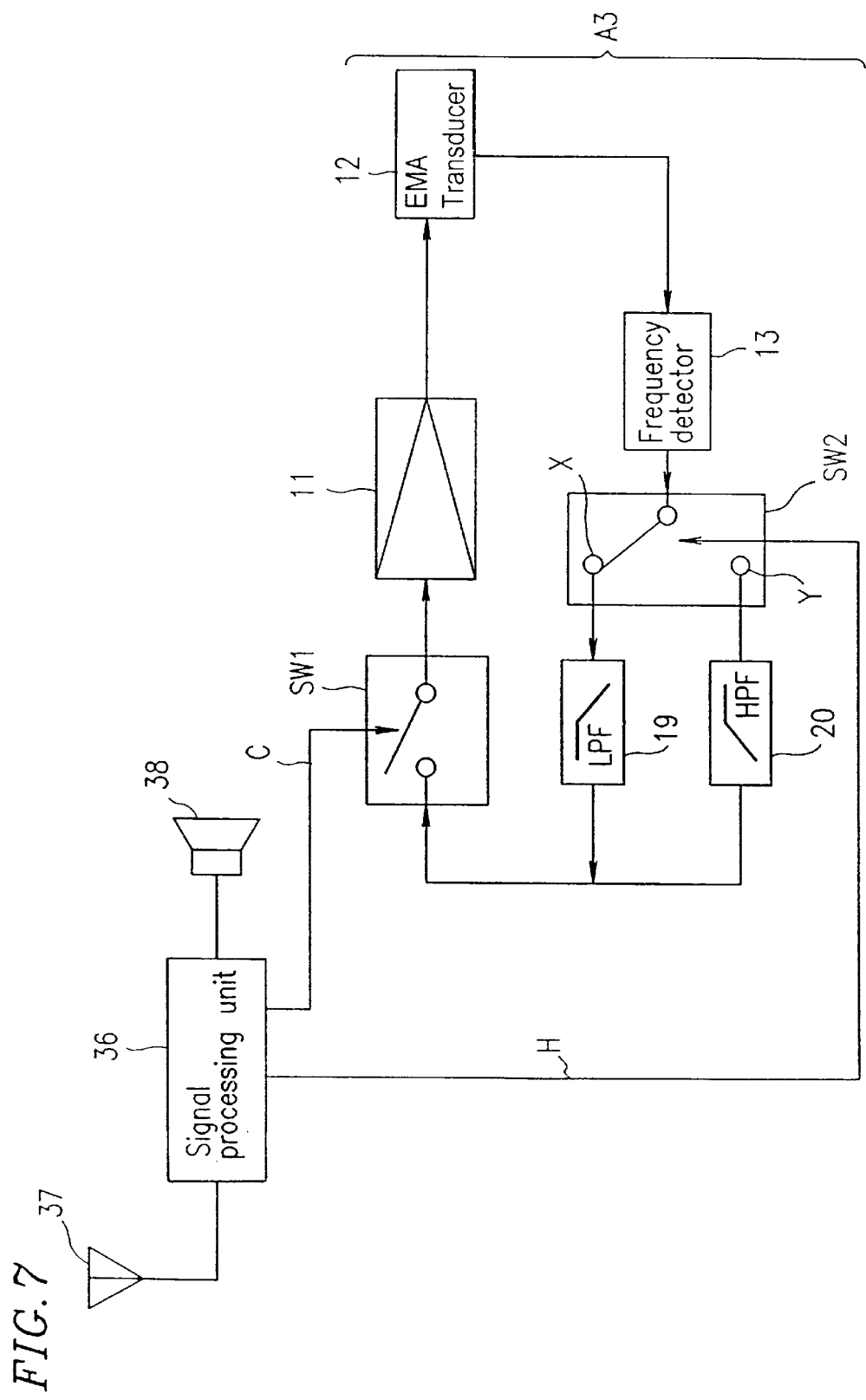
FIG. 7 is a block diagram showing the structure of an electro-mechanical-acoustic transducing device according to Example 3 of the present invention.

With reference to FIG. 7, the structure of the electro-mechanical-acoustic transducing device A3 according to Example 3 of the present invention will be described. FIG. 7 is a block diagram showing the structure of the electro-mechanical-acoustic transducing device A3 according to Example 3 along with an antenna 37, a received signal processing unit 36, and a receiver 38. In FIG. 7, the same components as those described above are denoted by the same reference numerals, and the description thereof will be herein omitted.

The electro-mechanical-acoustic transducing device A3 according to Example 3 includes a low-pass filter (LPF) 19 and a high-pass filter (HPF) 20 between a frequency detector 13 and an amplifier 11 in a feedback loop. A switch SW2 determines which one of the low-pass filter (LPF) 19 and the high-pass filter (HPF) 20 is selected, based on a signal H generated by the signal processing unit 36 in accordance with the setting of a selection switch (not shown) operated by a user.

The electro-mechanical-acoustic transducer 12 has at least two mechanical natural resonance frequencies as described above. When an electric signal with a frequency corresponding to the lower one of the natural resonance frequencies, i.e., f01 (FIG. 4) is applied, vibration is generally generated. On the other hand, when an electric signal with a frequency corresponding to the higher one of the natural resonance frequencies, i.e., f02 (FIG. 4) is applied, sound is generally generated. Therefore, at the time of generating vibration, the switch SW2 is set to a terminal X by the selection signal H which corresponds to the state of the aforementioned selection switch (not shown) so as to select the low-pass filter 19. As a result, a high frequency component (i.e., the frequency f02) in the signal which is feedbacked from the frequency detector 13 to the amplifier 11 is cut, so that only the low frequency component (i.e., the frequency f01) is feedbacked. On the other hand, at the time of generating sound, the switch SW2 is set to a terminal Y by the selection signal H so as to select the high-pass filter 20. As a result, a low frequency component (i.e., the frequency f01) in the signal which is feedbacked from the frequency detector 13 to the amplifier 11 is cut, so that only the high frequency component (i.e., the frequency f02) is feedbacked. Accordingly, in the case where either vibration or sound is generated upon the arrival of the signal, the switch SW2 is generally connected either the terminal X or Y as described above.

Alternatively, the signal C may be supplied to the switch SW1 as a repetitive pulse with a predetermined period, thereby successively turning the switch SW1 ON and OFF. Consequently, intermittent vibration and sound may be generated in an alternate manner. On the other hand, if the switch SW2 is alternately switched between the terminal X and the terminal Y while the switch SW1 is kept in an ON state, vibration and sound can be alternately genreated in a time-divisional manner.

In order to realize the operation as described above, characteristics of each of the filters 19 and 20 are set so that a frequency corresponding to the higher natural resonance frequency f02 of the electro-mechanical-acoustic transducer 12 is present in a rejection band of the low-pass filter 19, and a frequency corresponding to the lower natural resonance frequency f01 of the electro-mechanical-acoustic transducer 12 is present in a rejection band of the high-pass filter 20. Alternatively, it is possible to simultaneously generate vibration and sound by setting either the low-pass filter 19 or the high-pass filter 20 only to allow both signals having frequencies respectively corresponding to the two natural resonance frequencies to pass therethrough.

Moreover, in the case where the electro-mechanical-acoustic transducer 12 has three or more natural resonance frequencies, and the intermediate one of the natural resonance frequencies is to be used, a band-pass filter may be used instead of the filters 19 and 20 shown in FIG. 7.

The structure and characteristics of the frequency detector 13 are the same as those described in Example 1 with reference to FIG. 5 and the like, and the description thereof is herein omitted.

With the above-described structure, undesirable self-oscillation of the electro-mechanical-acoustic transducing device A3 is prevented. If such an electro-mechanical-acoustic transducing device A3 is used, for example, for a portable telephone, selection regarding which one of vibration and sound should be generated upon receiving a call can be performed very easily. In addition, as described in Example 1 of the present invention, by structuring the frequency detector 13 using the bridge circuit including temperature-sensitive resistors as component circuit elements, it becomes possible to obtain a stable output even when the operation temperature of the device is changed.

Figure 8:
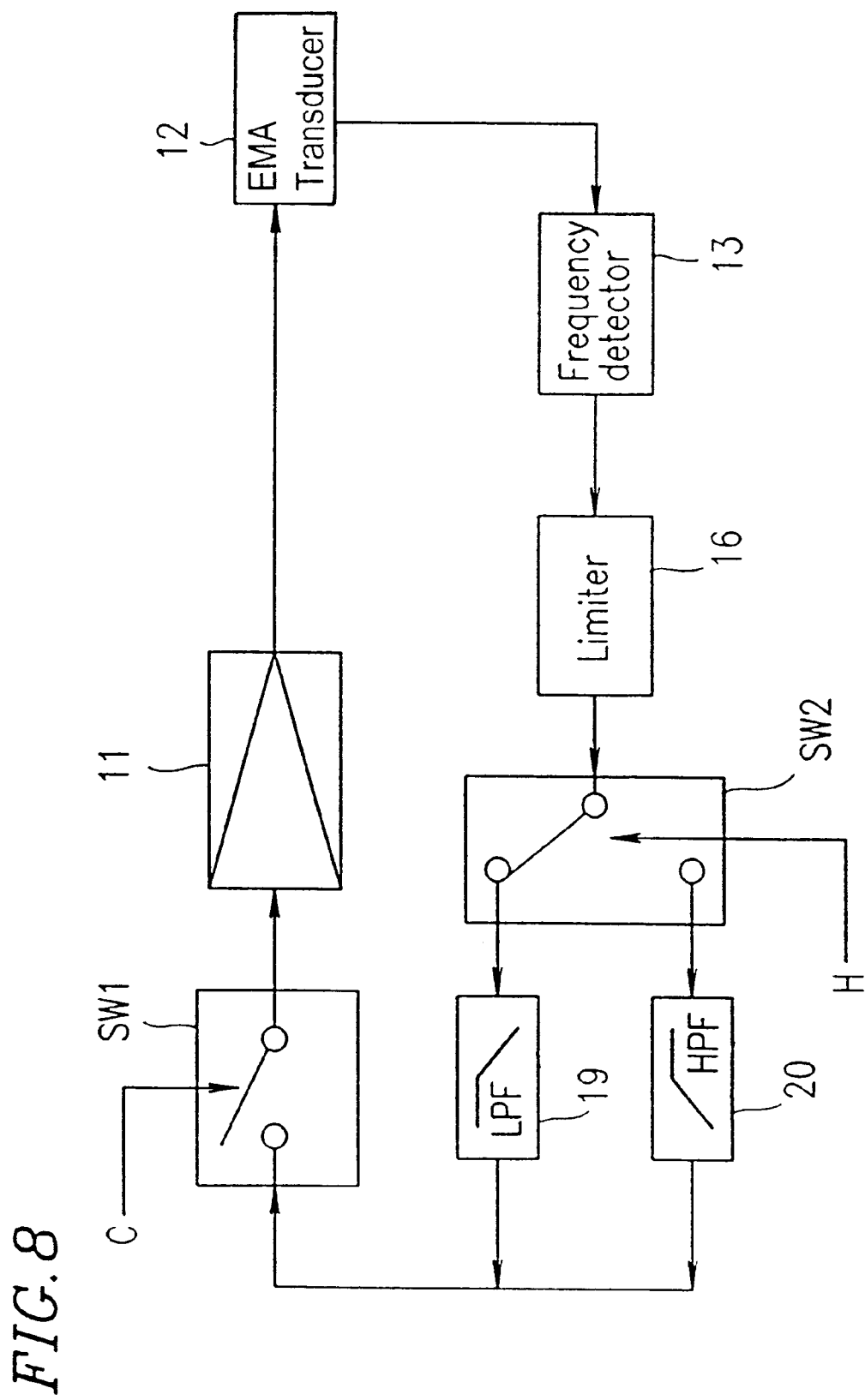
FIG. 8 is a block diagram showing the structure of a modification of the electro-mechanical-acoustic transducing device shown in FIG. 7.

FIG. 8 is a block diagram showing the structure in which a limiter 16 is provided at the output side of the frequency detector 13 in the electro-mechanical-acoustic transducing device A3 having the structure shown in FIG. 7. The antenna 37, the received signal processing unit 36, and the receiver 38 shown in FIG. 7 are omitted in FIG. 8.

The purpose for installing the limiter 16 is the same as that described in Example 1. Specifically, the limiter 16 limits the voltage level of a signal which is feedbacked from the frequency detector 13, and prevents an excessive input to the amplifier 11 or the electro-mechanical-acoustic transducer 12 due to the self-oscillation.

EXAMPLE 4

Figure 9:
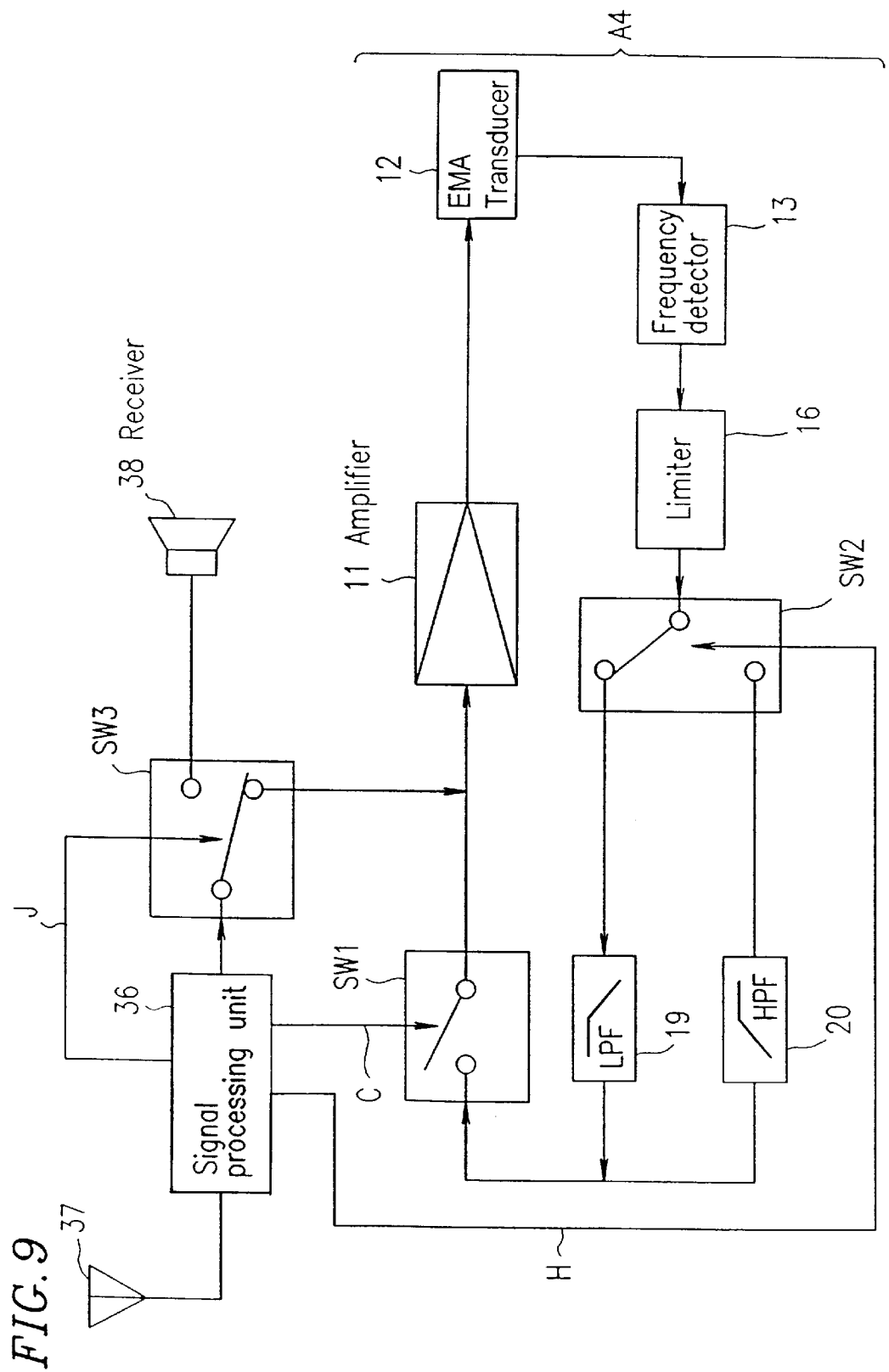
FIG. 9 is a block diagram showing the structure of an electro-mechanical-acoustic transducing device according to Example 4 of the present invention.

With reference to FIG. 9, the structure of an electro-mechanical-acoustic transducing device A4 according to Example 4 of the present invention will be described hereinafter. FIG. 9 is a block diagram showing the structure of the electro-mechanical-acoustic transducing device A4 of Example 4 along with the antenna 37, the received signal processing unit 36, and the receiver 38. The same components as those described above are denoted by the same reference numerals, and the description thereof will be herein omitted.

According to the electro-mechanical-acoustic transducing device A4 of Example 4, a switch SW3 is provided, controlled by a signal J, between the signal processing unit 36 and the receiver 38.

In general, receiving sound, which is a voice of a sender, is reproduced at the receiver 38 while the recipient holds the portable telephone closer to the ear. Therefore, the pressure of the sound reproduced from the receiver 38 is low, and such a reproduced receiving sound cannot be heard when the recipient is not holding the portable telephone closer to the ear. On the other hand, it is preferable that the pressure level of sound reproduced at the receiver 38 is controlled not to be increased more than necessary in order to prevent the damage to the ear. It should be noted, however, that when an appropriate sound level controlling unit is employed, the above problem can be overcome to allow the electro-mechanical-acoustic transducer 12 to simultaneously exhibit a function as the receiver 38. In such a case, the number of the transducers to be included in the electro-mechanical-acoustic transducer 12 can be reduced to one.

In view of the above, according to the electro-mechanical-acoustic transducing device A4 in Example 4, the switch SW3 is provided before the receive 38. After the switch SW1 is turned OFF, and therefore an output from the frequency detector 13 is out, a receiving signal which is an output of the signal processing unit 36, is input to the amplifier 11 by the switch SW3. After being amplified by the amplifier 11, the receiving signal is reproduced in the electro-mechanical-acoustic transducer 12. According to such a structure, the receiving sound reproduced in the electro-mechanical-acoustic transducer 12 can be heard even when the ear of the listener is away from the portable telephone. The reproduced signal may be a music signal or a message, instead of the receiving sound. Moreover, based on a signal from the switch SW3, vibration may be generated in the electro-mechanical-acoustic transducer 12. Furthermore, the receiving sound may be reproduced not only upon receiving the receiving sound but also when conversation is made between the sender and the recipient.

The structure and characteristic of the frequency detector 13 are the same as those described in Example 1 with reference to FIG. 5. As described in Example 1 of the present invention, by structuring the frequency detector 13 using the bridge circuit including temperature-sensitive resistors as component circuit elements, it becomes possible to obtain a stable output even when the operation temperature of the device is changed. Moreover, the purpose of installing the limiter 16 is the same as that described in Example 1. Specifically, the limiter 16 limits the voltage level of a signal which is feedbacked from the frequency detector 13, and prevents excessive input to the amplifier 11 or the electro-mechanical-acoustic transducer 12 due to the self-oscillation. However, it is possible to omit the installation of the limiter 16.

Figure 10:
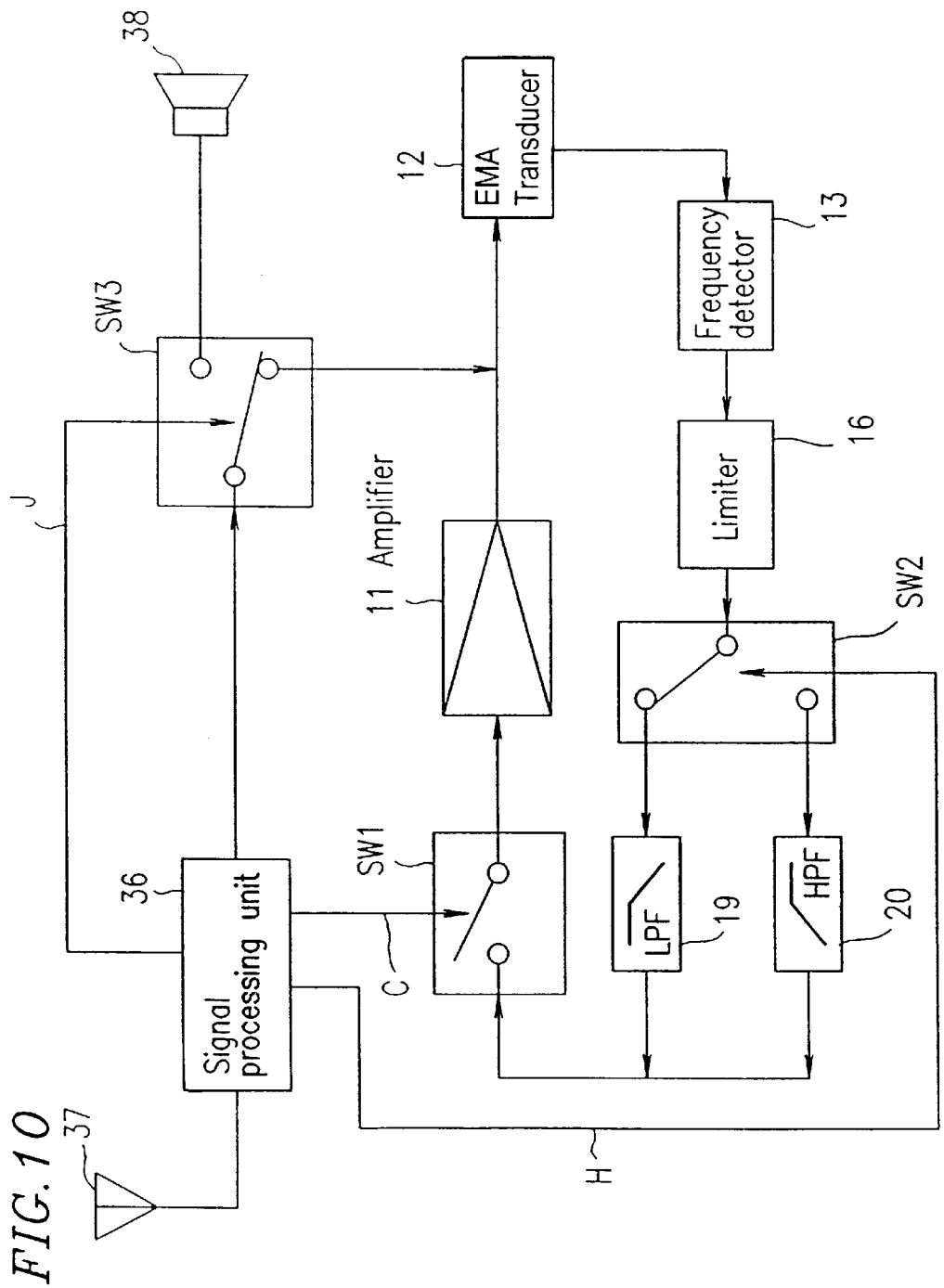
FIG. 10 is a block diagram showing the structure of a modification of the electro-mechanical-acoustic transducing device shown in FIG. 9.

FIG. 10 is a block diagram showing the structure in which an output of the switch SW3 is connected to the output side of the amplifier 11 in the electro-mechanical-acoustic transducing device A4 having the structure shown in FIG. 9. According to the structure shown in FIG. 10, the receiving sound which was amplified to a sound pressure level required to be reproduced in the electro-mechanical-acoustic transducer 12 is sent to the switch SW3 from the signal processing unit 36. As a result, it becomes possible to eliminate an adjusting step for adjusting an amplification factor of the amplifier 11, and the like.

EXAMPLE 5

Figure 11:
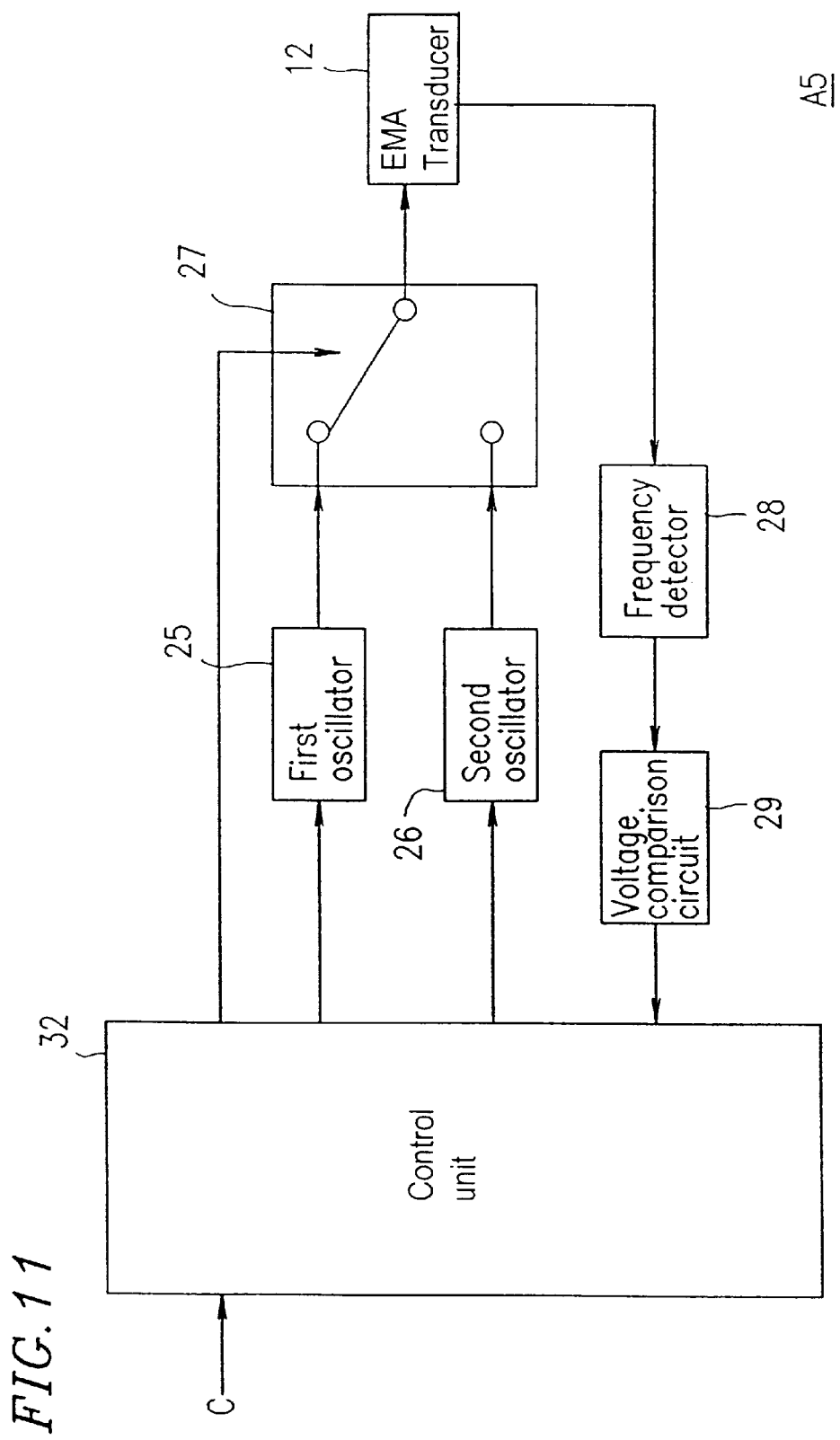
FIG. 11 is a block diagram showing the structure of an electro-mechanical-acoustic transducing device according to Example 5 of the present invention.

Next, with reference to FIG. 11, the structure of an electro-mechanical-acoustic transducing device A5 according to example 5 of the present invention will be described. FIG. 11 is a block diagram of the electro-mechanical-acoustic transducing device A5 of Example 5. In FIG. 11, the antenna 37, the received signal processing unit 36, and the receiver 38 described above are omitted.

In each of the aforementioned examples, it is assumed that a low level signal having a substantially constant voltage level over the entire range of the predetermined frequency band (e.g., a signal such as white noise) is used as a signal to be input to the electro-mechanical-acoustic transducer of the electro-mechanical-acoustic transducing device. The signal as described above may be generated in the signal generator, or may be a noise generated in the circuit system. According to such an arrangement, however, if a mechanical resonance frequency of the electro-mechanical-acoustic transducer of the electro-mechanical-acoustic transducer device is significantly varied for some reason, and thereby being off the frequency band of the signal to be input to the electro-mechanical-acoustic transducer; there exists a possibility of not being able to sufficiently perform the desired signal detection and amplification operation. According to the present example, in order to deal with the situation as described above, an oscillator capable of generating a signal with a frequency band according to a control signal supplied from outside (i.e., an oscillator with an output signal of a variable frequency) is used as a generation source for the signal to be input to the electro-mechanical-acoustic transducer.

According to the structure shown in FIG. 11, the reference numeral 12 denotes the aforementioned electro-mechanical-acoustic transducer according to the present invention. Reference numeral 25 denotes a first oscillator which generates an electric signal of a low output level in a frequency band including a mechanical resonance frequency of the electro-mechanical-acoustic transducer 12, and the first oscillator has the function corresponding to the signal generator 10 described in Example 1. Reference numeral 26 denotes a second oscillator which is controlled by the later-described controlling unit 32. Reference numeral 27 denotes a switch for selecting an output to be input to the electro-mechanical-acoustic transducer 12 between the output of the first oscillator 25 and the output of the second oscillator 26. Reference numeral 28 denotes a frequency detector for detecting the mechanical resonance frequency of the electro-mechanical-acoustic transducer 12 and selectively feedbacking a signal having a frequency corresponding to the detected mechanical resonance frequency. The frequency detector 28 corresponds to the aforementioned frequency detector 13. Reference numeral 29 denotes a voltage comparison circuit for detecting a potential difference between the output voltage of the frequency detector 28 and the predetermined reference potential. Reference numeral 32 denotes a controlling unit for controlling the operation of the aforementioned first oscillator 25, the second oscillator 26, and the switch 27, in response to the signal C explained in connection with Example 1.

The structure and characteristics of the frequency detector 28 are the same as those described for the frequency detector 13 in Example 1 with reference to FIG. 5, and the like. As described in Example 1, by structuring the frequency detector 28 using a bridge circuit which includes temperature-sensitive resistors as component circuit elements, it becomes possible to obtain a stable output even when the operation temperature of the device is changed. Moreover, in the same manner as that in Example 1, the limiter 16 may be provided for the purpose of limiting the voltage level of a signal which is feedbacked from the frequency detector 28.

The operation of the thus-structured electro-mechanical-acoustic transducing device A5 will be described hereinafter.

First, the first oscillator 25 is allowed to oscillate by the instruction of the controlling unit 32, with the switch 27 being connected to the first oscillator 25. The oscillation in this case is performed by sweeping a frequency band including a frequency which corresponds to at least one of the mechanical resonance frequencies of the electro-mechanical-acoustic transducer 12 (e.g., one of f01 and f02 in FIG. 4). The sweep signal is input to the electro-mechanical-acoustic transducer 12, and the corresponding output signal is detected by the frequency detector 28. At the same time, the voltage comparison circuit 29 compares the output voltage of the frequency detector 28 with the reference potential, and sends the comparison result to the controlling unit 32. When the output voltage of the frequency detector 28 is detected to reach or exceed the reference potential, the controlling unit 32 switches the switch 27 to the second oscillator 26, thereby oscillating the second oscillator 26 at the frequency upon the above detection (which corresponds to one of the mechanical resonance frequencies f01 and f02 of the electro-mechanical-acoustic transducer 12). The output signal from the second oscillator 26 is supplied to the electro-mechanical-acoustic transducer 12, thereby operating the electro-mechanical-acoustic transducer 12 at the oscillation frequency of the second oscillator 26.

Next, the controlling unit 32 switches the switch 27 again, thereby connecting the first oscillator 25 to the electro-mechanical-acoustic transducer 12. The frequency band of the sweep signal at this time is set to be different from the previous one so as to include a frequency which corresponds to the other mechanical resonance frequency of the electro-mechanical-acoustic transducer 12 (e.g., the other one of f01 and f02 in FIG. 4). In the same manner as described above, the transducer 12, and the corresponding output signal is detected by the frequency detector 28. At the same time, the voltage comparison circuit 29 compares the output voltage of the frequency detector 28 with the reference potential, and sends the comparison result to the controlling unit 32. When the output voltage of the frequency detector 28 is detected to reach or exceed the reference potential, the controlling unit 32 switches the switch 27 to the second oscillator 26, thereby oscillating the second oscillator 26 at the frequency upon the above detection (which corresponds to the other one of the mechanical resonances frequencies f01 and f02 of the electro-mechanical-acoustic transducer 12). The output signal from the second oscillator 26 is supplied to the electro-mechanical-acoustic transducer 12, thereby operating the electro-mechanical-acoustic transducer 12 again in the oscillation frequency of the second oscillator 26.

By repeating the above-described operations, in the electro-mechanical-acoustic transducing device A5 according to Example 5, the frequency having the largest value as the potential difference between the output voltage of the frequency detector 28 and the reference potential is detected as the mechanical natural resonance frequency of the electro-mechanical-acoustic transducer 12. An electric signal having the detected frequency is input from the second oscillator 26 to the electro-mechanical-acoustic transducer 12. As a result, the generation of either vibration or sound is performed in the electro-mechanical-acoustic transducer 12. According to this example, since the mechanical natural resonance freqency of the electro-mechanical-acoustic transducer 12 is found very easily, the operation of the electro-mechanical-acoustic transducer 12 in this resonance frequency can be performed more quickly and easily as compared to the structure of the electro-mechanical-acoustic transducer in each of the aforementioned examples.

In the case where it is confirmed by the voltage comparison circuit 29 that the resonance point is shifted due to a change in the operation environment of the device, and the level of potential difference with respect to the output signal form the electro-mechanical-acoustic transducer 12 is thereby reduced, the controlling unit 32 drives the switch 27 again so as to be connected to the first oscillator 25. Then, the series of the above-described operations from the original detection of the resonance frequency may be performed again. In this manner, it is possible to cope with the change in the operation environment for the device.

EXAMPLE 6

Figure 12:
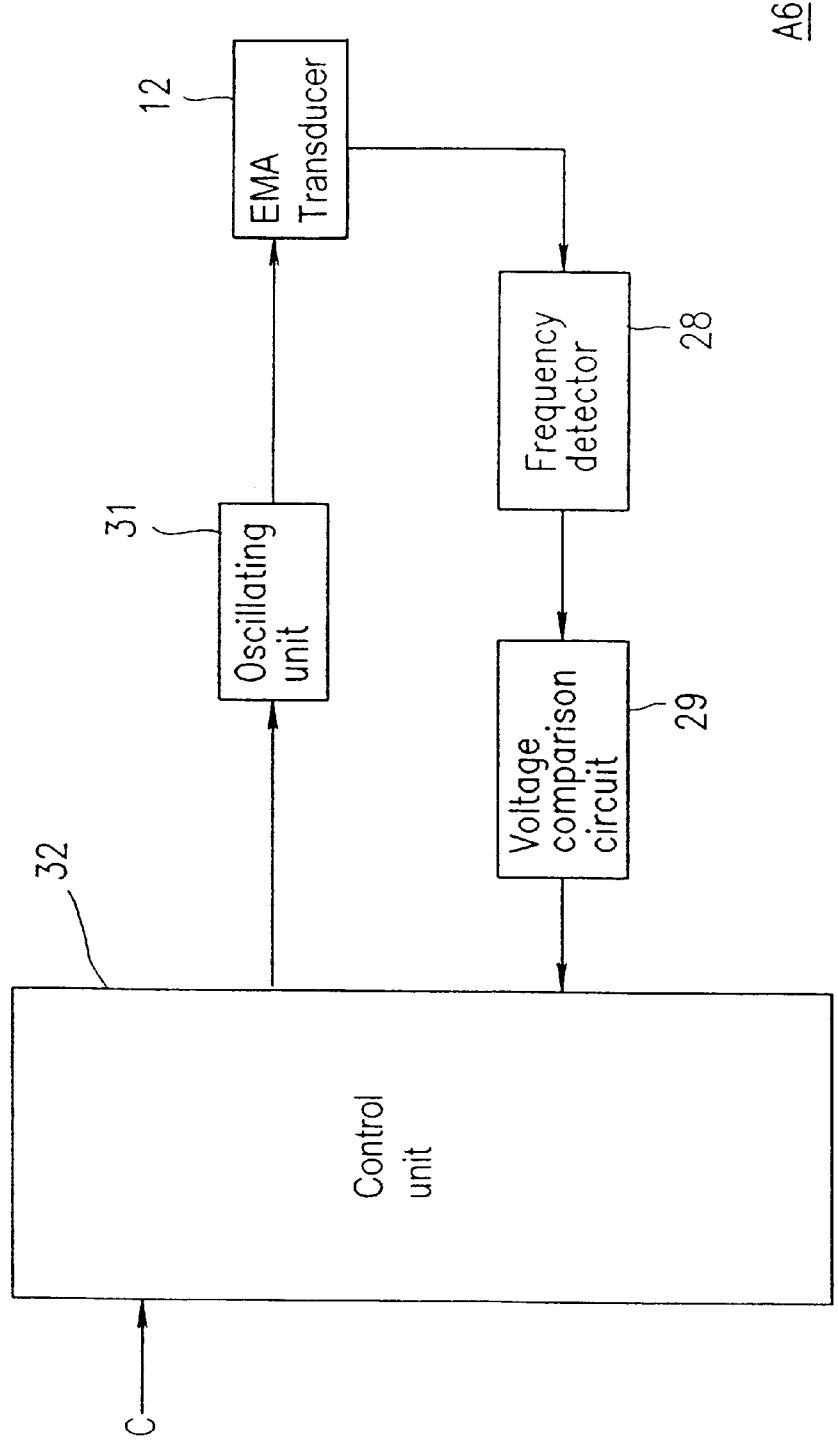
FIG. 12 is a block diagram showing the structure of an electro-mechanical-acoustic transducing device according to Example 6 of the present invention.

With reference to FIG. 12, the structure of an electro-mechanical-acoustic transducing device A6 according to Example 6 of the present invention will be described. FIG. 12 is a block diagram of the electro-mechanical-acoustic transducing device A6. In FIG. 12, the antenna 37, the received signal processing unit 36, and the receiver 38 descried above are omitted. The same components as those included in the block diagram of FIG. 11 are denoted by the same reference numerals, and the description thereof is herein omitted.

The electro-mechanical-acoustic transducing device A6 according to Example 6 includes a single oscillating unit 31. The operation of the electro-mechanical-acoustic transducing device A6 is as follows. First, a frequency detector 28 detects a mechanical resonance frequency of the electro-mechanical-acoustic transducer 12, and sends the detection results, via a voltage comparison circuit 29, to a controlling unit 32. Next, the controlling unit 32 transmits the detected resonance frequency to the oscillating unit 31. As a result, the oscillating unit 31 oscillates (i.e., generates) an electric signal having the frequency corresponding to the transmitted mechanical resonance frequency. This oscillation signal sufficiently drives the electro-mechanical-acoustic transducer 12 (i.e., generates vibration and/or sound).

The structure and characteristics of the frequency detector 28 are the same as those described for the frequency detector 13 in Example 1 with reference to FIG. 5, and the like. As described in Example 1, by structuring the frequency detector 28 using a bridge circuit which includes temperature-sensitive resistors as component circuit elements, it becomes possible to obtain a stable output even when the operation temperature for the device is changed. Moreover, in the same manner as that in Example 1, the limiter 16 may be provided for the purpose of limiting the voltage level of a signal which is feedbacked from the frequency detector 28.

The re-detection of a resonance frequency in the case where the mechanical resonance frequency of the electro-mechanical-acoustic transducer 12 is changed along with a change in the operation environment for the device, and the re-oscillating operation at the frequency corresponding to the re-detected resonance frequency are the same as the corresponding operation in the electro-mechanical-acoustic transducing device A5 according to Example 5, and the description thereof is herein omitted.

According to the thus-structured electro-mechanical-acoustic transducing device A6 of Example 6, the number of oscillating means is reduced to one, thereby realizing the electro-mechanical-acoustic transducing device having a simple circuit configuration.

If two resonance frequencies are instructed in a time-divisional manner from the controlling unit 32 to the oscillating unit 31, it is possible to oscillate the oscillating unit 31 in a time-divisional manner at the two resonance frequencies. As a result, it is possible to alternately generate vibration and sound in the electro-mechanical-acoustic transducer 12. Thus, in addition to the reduction in the number of oscillating means to one, it is possible to maintain a stable resonance state by constantly monitoring and correcting the change of the mechanical resonance frequency in the electro-mechanical-acoustic transducer 12 due to the change in the operation environment for the device, or the like.

Each component, excluding electro-mechanical-acoustic transducer 12, in the electro-mechanical-acoustic transducing device A5 or the electro-mechanical-acoustic transducing A6 according to Examples 5 and 6, respectively, may be integrated as a microcomputer.

According to the examples described above, the electro-mechanical-acoustic transducer is of a conductive type transducer which utilizes a magnetic force that is generated in the voice coil inserted into a magnetic field (i.e., a magnetic gap). Alternatively, the present invention can exhibit the same effects even when the electro-mechanical-acoustic transducer is of any other transducer such as a piezoelectric type transducer or an electromagnetic type transducer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An electro-mechanical-acoustic transducing device, comprising:

An electro-mechanical-acoustic transducer having at least one resonance frequency;

a signal supplying unit for receiving an input electric signal having a predetermined frequency band including the at least one resonance frequency and for supplying the input electric signal to the electro-mechanical-acoustic transducer, the electro-mechanical-acoustic transducer converting an electric signal having the at least one resonance frequency included in the predetermined frequency band into at least one of vibration and sound; and a frequency detector for detecting the at least one resonance frequency of the electro-mechanical-acoustic transducer and for generating a feedback electric signal having the detected at least one resonance frequency, wherein the signal supplying unit further receives the feedback electric signal from the frequency detector and supplies the input electric signal and the feedback electric signal to the electro-mechanical-acoustic transducer.

2. An electro-mechanical-acoustic transducing device according to claim 1, wherein the signal supplying unit receives a noise which is generated in an electrical circuit system including at least one of the signal supplying unit and the frequency detector as the input electric signal.

3. An electro-mechanical-acoustic transducing device according to claim 1, further comprising a signal generator for generating the input electric signal, and supplying the input electric signal to the signal supplying unit.

4. An electro-mechanical-acoustic transducing device according to claim 3, wherein the signal supplying unit receives a noise which is generated in an electrical circuit system including at least one of the signal supplying unit and the input electric signal generated by the signal generator.

5. An electro-mechanical-acoustic transducing device according to claim 1, wherein the frequency detector includes a bridge circuit constituted by using an electrical impedance of a predetermined component of the electro-mechanical-acoustic transducer.

6. An electro-mechanical-acoustic transducing device according to claim 5, wherein the predetermined component of the electro-mechanical-acoustic transducer is a voice coil.

7. An electro-mechanical-acoustic transducing device according to claim 5, wherein each of the other three circuit components of the bridge circuit is a circuit component containing a resistance component.

8. An electro-mechanical-acoustic transducing device according to claim 5, wherein in a case where an electrical impedance of the predetermined component of the electro-mechanical-acoustic transducer is named Z1; an electrical impedance of the component circuit element of the bridge circuit, which is serially connected to the electrical impedance Z1, is named Z2; and electrical impedances of the component circuit elements of the bridge circuit, constituting a serial connection circuit which is connected in parallel to a serial connection circuit of the electrical impedances Z1 and Z2 are named Z3 and Z4, the bridge circuit is structured so that an input voltage is supplied between a node of the electrical impedance Z1 and the electrical impedance Z3 and a node of the electrical impedance Z2 and the electrical impedance Z4, and an output voltage is taken out from between a node of the electrical impedance Z1 and the electrical impedance Z2 and a node of the electrical impedance Z3 and the electrical impedance Z4.

9. An electro-mechanical-acoustic transducing device according to claim 8, wherein the electrical impedance Z2 is a temperature-sensitive resistor in which a resistance value thereof is changed along with a change of an ambient temperature.

10. An electro-mechanical-acoustic transducing device according to claim 9, wherein resistance-temperature characteristics of the temperature-sensitive resistor is substantially the same as that of the electrical impedance Z1 which is the predetermined component of the electro-mechanical-acoustic transducer.

11. An electro-mechanical-acoustic transducing device according to claim 1, further comprising a filter for allowing a signal having the at least one resonance frequency of the electro-mechanical-acoustic transducer to pass therethrough.

12. A portable terminal device, comprising:

an antenna for receiving a call-incoming signal;

a received signal processing unit for performing a signal-processing operation for the call-incoming signal and outputting a predetermined electric signal; and an electro-mechanical-acoustic transducing device according to claim 1, wherein a signal input condition to the electro-mechanical-acoustic transducing device is controlled by the electric signal from the received signal processing unit.

13. A portable terminal device according to claim 12, wherein the signal which is output from the received signal processing unit is supplied as a part of the input signal of the signal supplying unit included in the electro-mechanical-acoustic transducing device.

14. A portable terminal device according to claim 12, wherein the signal which is output from the received signal processing unit is supplied as a part of the input signal of the electro-mechanical-acoustic transducer included in the electro-mechanical-acoustic transducing device.

15. A portable terminal device according to claim 12, wherein the electro-mechanical-acoustic transducer included in the electro-mechanical-acoustic transducing device is configured to further exhibit a function as a receiver for reproducing audio signal to a user.

16. An electro-mechanical-acoustic transducing device according to claim 1, wherein the signal supplying unit includes an amplifier for amplifying the input electric signal and the feedback signal.

17. An electro-mechanical-acoustic transducing device, comprising:

an electro-mechanical-acoustic transducer structured so as to have at least two resonance frequencies and to respectively convert input electric signals having frequencies corresponding to the at least two resonance frequencies into vibration and sound;

a signal supplying unit comprising a first oscillator for oscillating a first electric signal in a frequency band including at least one of the at least two resonance frequencies of the electro-mechanical-acoustic transducer as the input electric signal of the electro-mechanical-acoustic transducer, and a second oscillator for oscillating a second electric signal at a frequency corresponding to at least one of the at least two resonance frequencies of the electro-mechanical-acoustic transducer and outputting the second electric signal as the input electric signal of the electro-mechanical-acoustic transducer;

a frequency detector for detecting a signal component having a freqency corresponding to the at least one of the at least two resonance frequencies of the electro-mechanical-acoustic transducer in an electric signal which is output from the electro-mechanical-acoustic transducer, and outputting the signal component as a part of an input signal to the signal supplying unit; and a controller for controlling the second oscillator so as to oscillate a signal having a frequency corresponding to one of the at least two resonance frequencies of the electro-mechanical-acoustic transducer at a predetermined timing based on detection information of the frequency detector.

18. An electro-mechanical-acoustic transducing device according to claim 17, further comprising a voltage comparator for comparing an output voltage of the frequency detector with a predetermined reference potential, and supplying information regarding a potential difference to the controller.

19. An electro-mechanical-acoustic transducing device, comprising:

an electro-mechanical-acoustic transducer which has at least one resonance frequency, for converting an input electric signal having a frequency corresponding to the at least one resonance frequency into only vibration, or into both vibration and sound;

a signal supplying unit comprising an oscillator for oscillating an electric signal in a frequency band including at least one of the at least one resonance frequency of the electro-mechanical-acoustic transducer, and outputting the electric signal as an input electric signal of the electro-mechanical-acoustic transducer;

a frequency detector for detecting a signal component having a frequency corresponding to the at least one resonance frequency of the electro-mechanical-acoustic transducer in an electric signal which is output from the electro-mechanical-acoustic transducer, and outputting the signal component as a part of an input signal to the signal supplying unit; and a controller for controlling the oscillator so as to oscillate a signal having a frequency corresponding to the at least one resonance frequency of the electro-mechanical-acoustic transducer at a predetermined timing based on detection information of the frequency detector.

20. An electro-mechanical-acoustic transducing device according to claim 19, further comprising a voltage comparator for comparing an output voltage of the frequency detector with a predetermined reference potential and supplying information regading a potential difference to the controller.

21. An electro-mechanical-acoustic transducing device according to claim 19, wherein the controller controls the oscillator so that the oscillator performs oscillation of the electric signal in the frequency band including at least one of the resonance frequencies of the electro-mechanical-acoustic transducer and oscillation of the signal having the frequency corresponding to the mechanical resonance frequency of the electro-mechanical-acoustic transducer which is detected by the frequency detector in a time-divisional manner.

22. An electro-mechanical-acoustic transducing device according to claim 19, wherein the controller controls the oscillator so that the oscillator oscillates the electric signal so as to sweep the frequency band including at least one of the resonance frequencies of the electro-mechanical-acoustic transducer, and upon detection by the frequency detector of the mechanical resonance frequency of the electro-mechanical-acoustic transducer, oscillates the signal having the frequency corresponding to the detected mechanical resonance frequency.

23. An electro-mechanical-acoustic transducing device, comprising:

an electro-mechanical-acoustic transducer which has at least one resonance frequency, for converting an input electric signal having a frequency corresponding to the at least one resonance frequency into only vibration, or into both vibration and sound;

a signal supplying unit for supplying a signal in a frequency band which includes at least one of the at least one resonance frequency of the electro-mechanical-acoustic transducer as the input electric signal of the electro-mechanical-acoustic transducer;

a frequency detector for detecting a signal component having a frequency corresponding to the at least one resonance frequency of the electro-mechanical-acoustic transducer in an electric signal which is output from the electro-mechanical-acoustic transducer, and outputting the signal component as a part of an input signal to the signal supplying unit; and a filter for allowing a signal having a frequency corresponding to the at least one resonance frequency of the electro-mechanical-acoustic transducer to pass therethrough.

* * * * *